Jan. 17, 1961  J. DAUGHERTY ET AL  2,968,517
TILTING AND INDEXING CHUCK FOR MACHINE TOOLS
Filed March 28, 1955  8 Sheets-Sheet 2
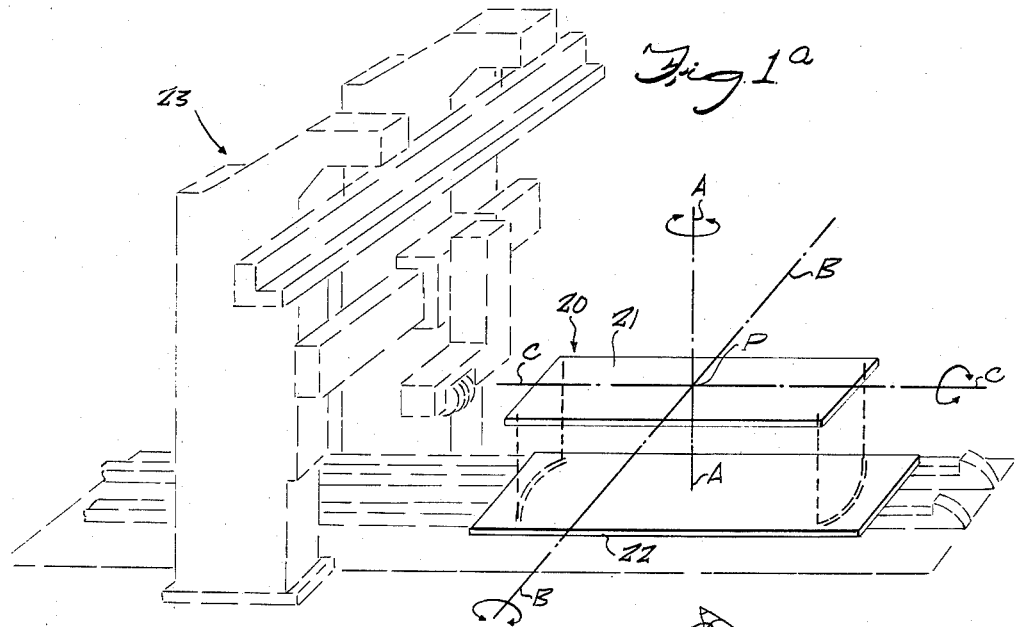
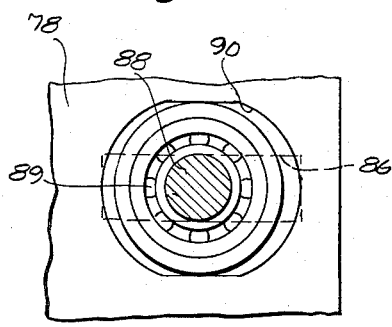
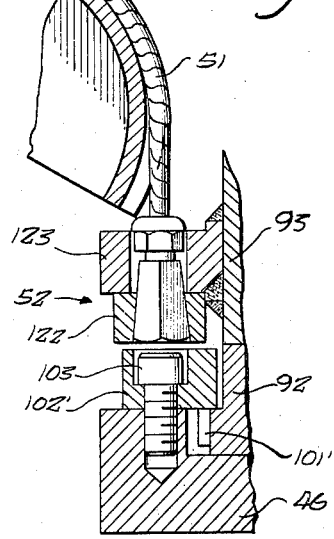
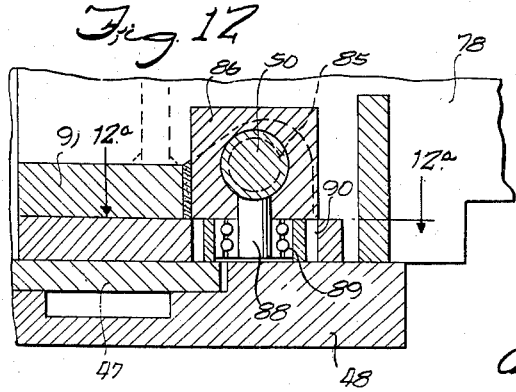
Inventors
Jesse Daugherty
Alex A Durand
Leonard G. Wheeler
Charles F. Coffill
Joseph Skattes Jr.
Angelo L. Galgano
Carlson, Pitzner, Hubbard & Wolfe
Attorneys

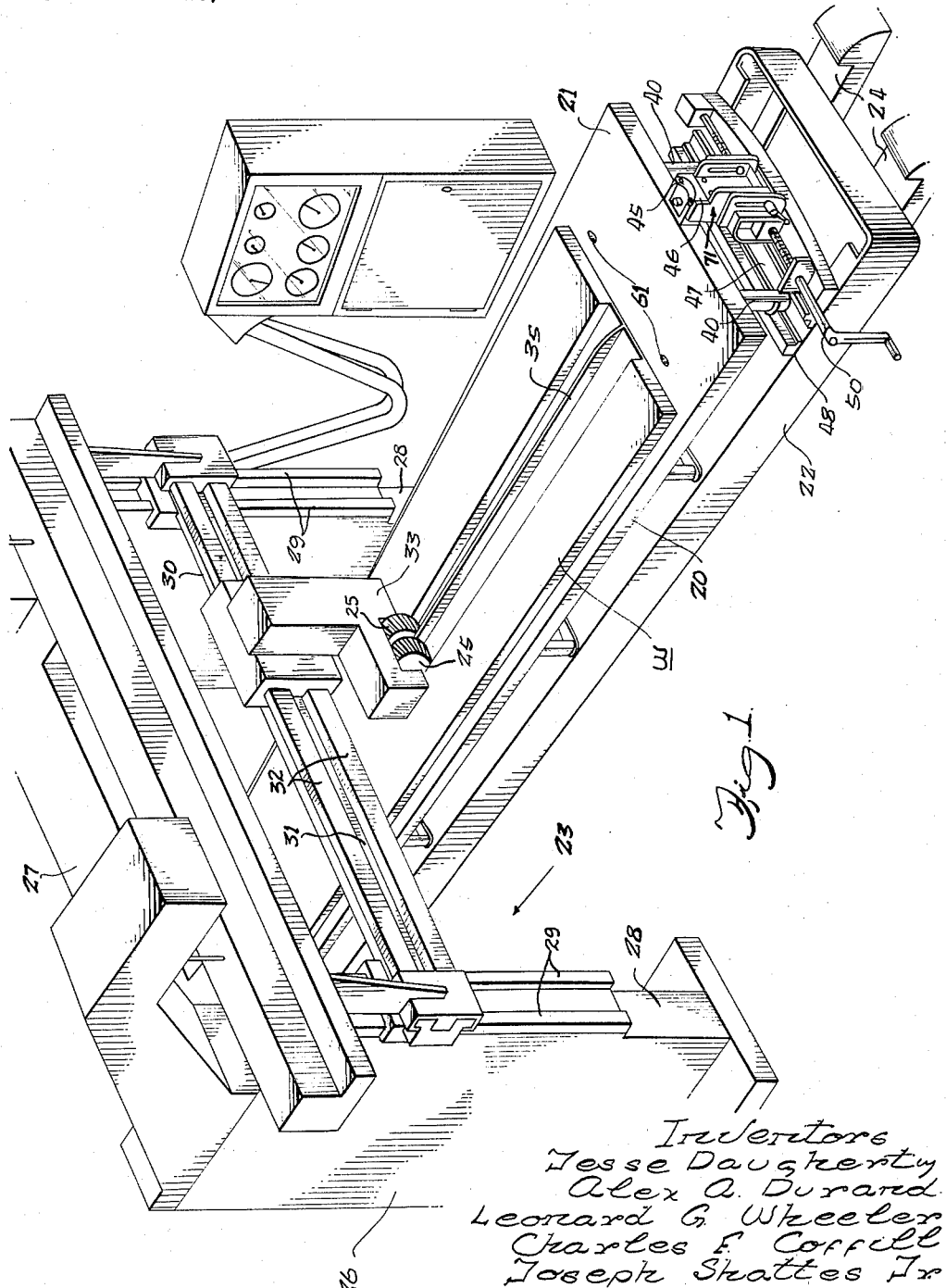

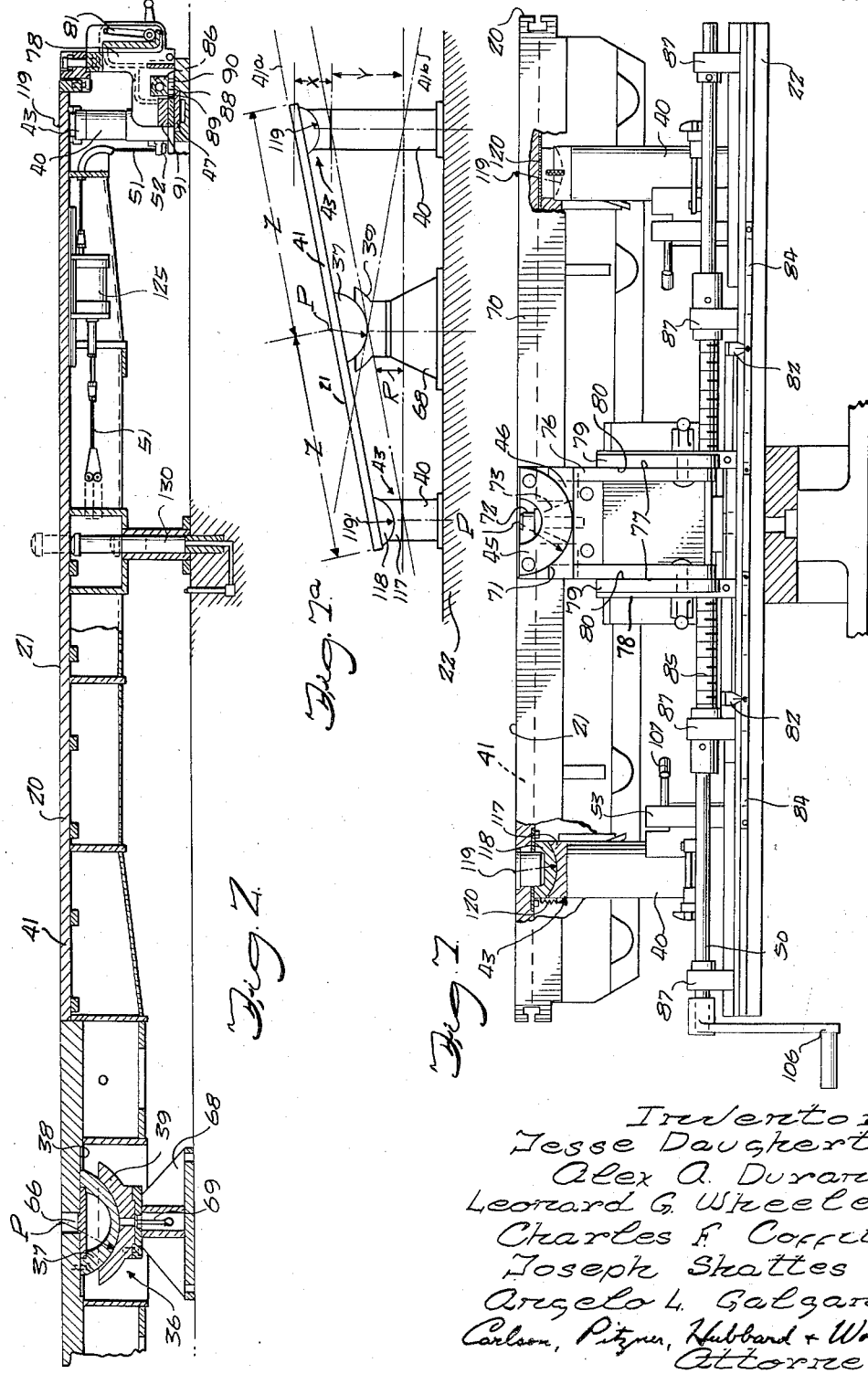

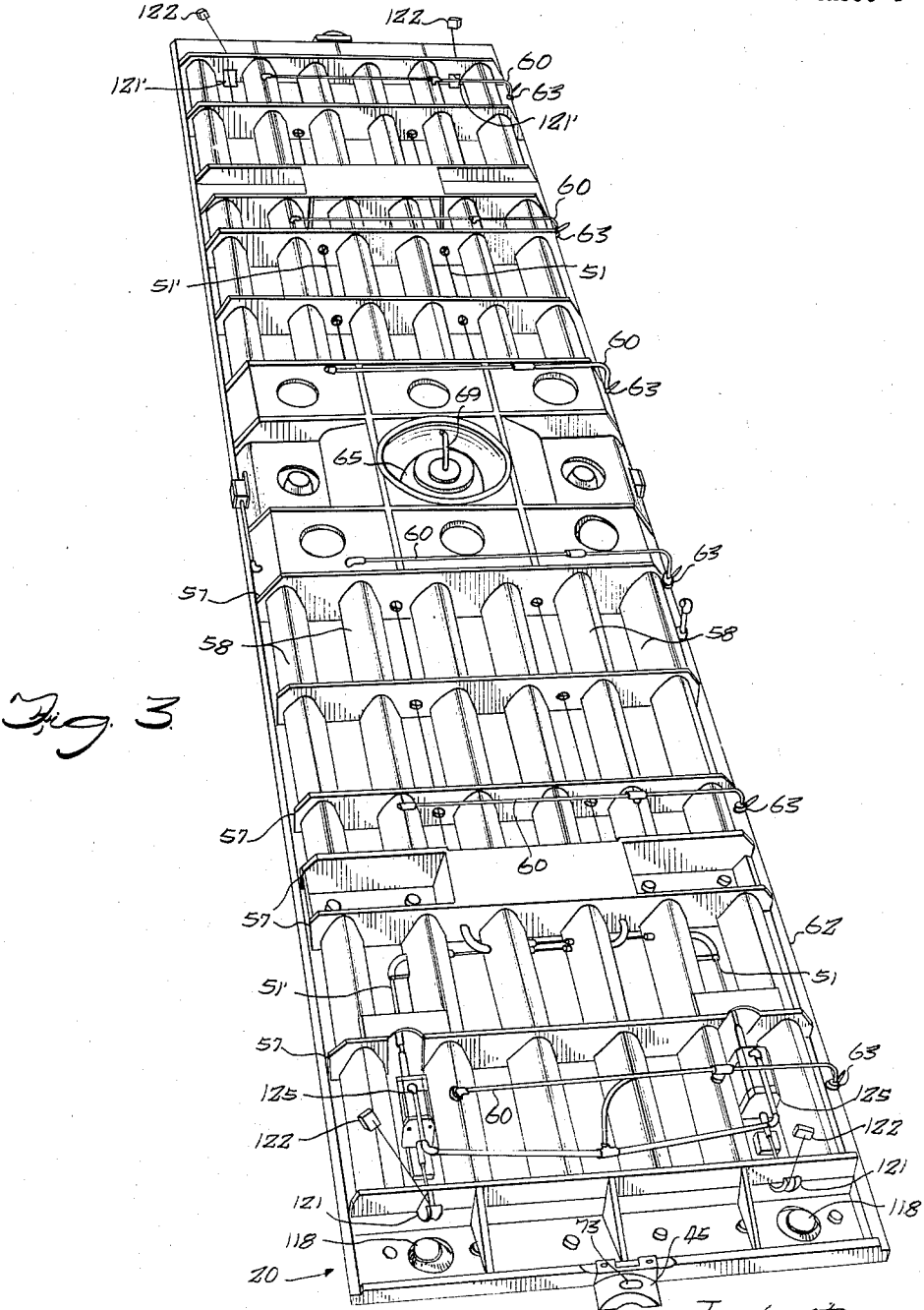

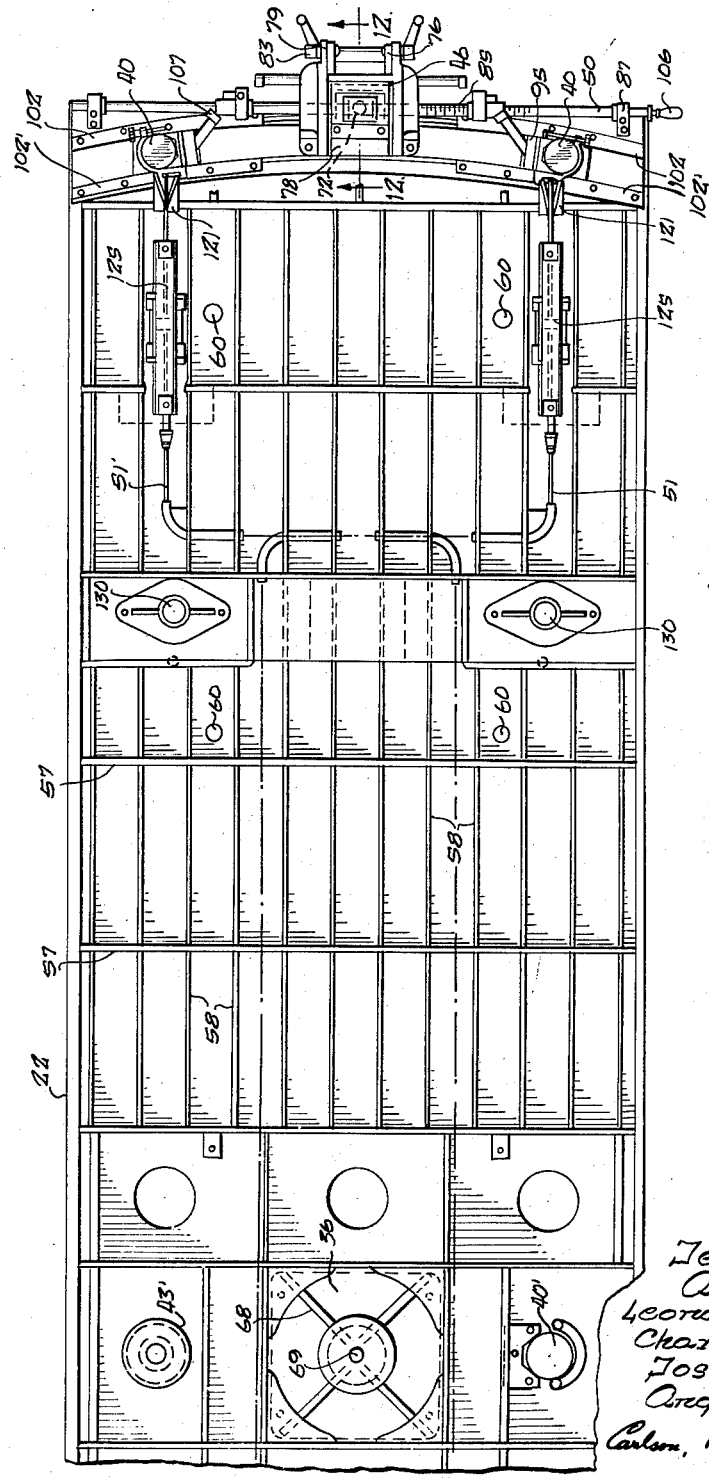

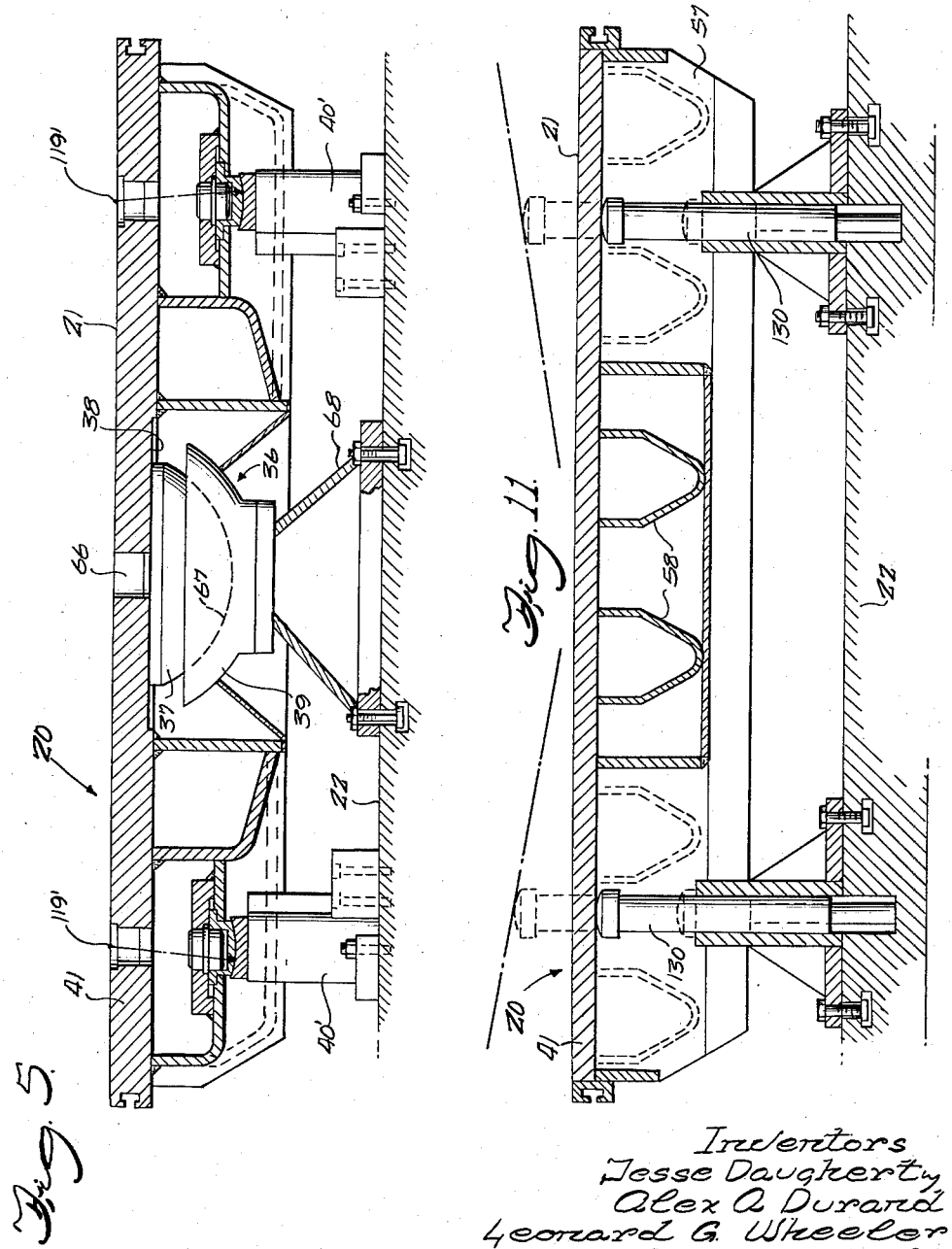

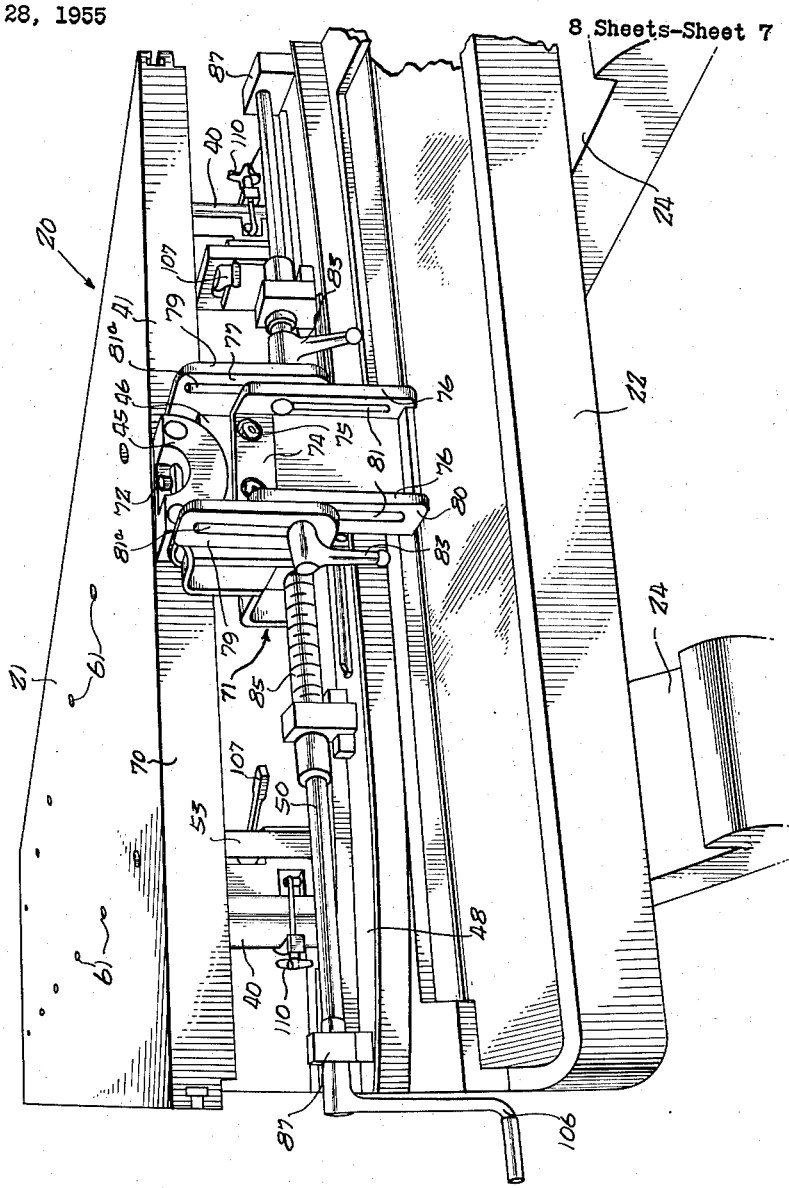

Jan. 17, 1961   J. DAUGHERTY ET AL   2,968,517
TILTING AND INDEXING CHUCK FOR MACHINE TOOLS
Filed March 28, 1955                    8 Sheets-Sheet 8

Inventors
Jesse Daugherty
Alex A. Durand
Leonard G. Wheeler
Charles F. Corrill
Joseph Skattes Jr
Angelo L. Galgano
Carlson, Pitzner, Hubbard + Wolfe
Attorneys

United States Patent Office 2,968,517
Patented Jan. 17, 1961

2,968,517

TILTING AND INDEXING CHUCK FOR MACHINE TOOLS

Jesse Daugherty, Fond du Lac, and Alex A. Durand, Milwaukee, Wis., and Leonard G. Wheeler and Charles F. Coffill, Massapequa, Joseph Shattes, Jr., Huntington, and Angelo L. Galgano, Babylon, N.Y., assignors, by direct and mesne assignments, of one-half to Giddings & Lewis Machine Tool Company, Fond du Lac, Wis., a corporation of Wisconsin, and one-half to said Wheeler, said Coffill, said Shattes, Jr., and said Galgano Filed Mar. 28, 1955, Ser. No. 497,304

11 Claims. (Cl. 311—38)

The present invention relates generally to workholding accessories for machine tools and, more specifically, to a novel workholder or chuck which finds particular but not exclusive utility in supporting sheet or slab workpieces in positions convenient for machining predetermining contours therein.

In machining certain classes of work, the contours to be generated may require sequential passes of the tool or cutter along non-parallel paths. The machining of integrally stiffened skin panels for aircraft may, for example, call for forming converging ribs integral with the skin. These ribs may also have various degrees of taper and the skin situated between them may taper or vary in thickness. Because of weight limitations and other factors resulting from the nature of such work, machining tolerances are exceptionally close and surface finish requirements are high.

The classes of work just mentioned can be done on various types of machine tools using a wide variety of machining procedures. It is well known, however, that high feed rates, close tolerances, and good surface finish can be achieved consistently in machines where the cutter path lies parallel to the direction of one of the major component elements of the machine. In the case of a planer type milling machine, for example, it is desirable to have the cutter path parallel to the movement of the table. On the other hand, in machines where the work is fixed and the cutter is traversed bodily the cutter path should be parallel to the path of the major machine element which traverses the cutter. Operation of machines in this manner also simplifies the controls involved.

It is, therefore, an object of the present invention to provide an improved workholder or chuck which can be mounted on the work table of a milling machine or other machine tool and which can be adjusted angularly about vertical, transverse, and longitudinal axes within close tolerances relative to the table, thereby permitting the machining of compound tapers and cotnours accurately and rapidly without the use of complex controls.

Another object of the invention is to provide a workholder of the character set forth and of large surface area upon which an article in sheet form may be conveniently and positively held while it is being machined in a direction parallel to the movement of the table, or to the movement of the other major machine element which defines the cutter path on the work, in order to produce a finished article, such as an aircraft wing skin, having accurately formed tapered and converging sections.

A further object of the invention is to provide a workholder of the above type and of unitary construction, reducing the weight while increasing the stability and ease of adjustment of the large workholding face so that changes in rib angle or skin thickness can be accomplished without removal of the skin from the chuck.

Another object of the invention is to provide a workholder of the type set forth above and having tilting and indexing or angular adjustments which may be quickly and accurately set and fixed independently of each other yet which provide the necessary stability when both are fixed in the desired position.

Further objects and advantages of the invention will become apparent as the following description proceeds, taken in connection with the accompanying drawings, in which:

Figure 1 is a perspective view of an exemplary chuck embodying the invention and shown, for purposes of illustration, as mounted on a planer type milling machine.

Fig. 1a is a schematic diagram illustrating the principal adjusting movements of the chuck.

Fig. 2 is a partial cross-sectional view on a longitudinal axis of the chuck as mounted on the machine table.

Fig. 3 is a perspective view of the chuck in inverted position and showing details of its underside.

Fig. 4 is an enlarged partial plan view of the chuck with the top surface removed to show underlying structural details.

Fig. 5 is an enlarged cross-sectional view through the center of the chuck and showing the major support bearing in elevation.

Fig. 6 is an enlarged perspective end view of the chuck as mounted on the table showing the index and tilt adjustment members.

Fig. 7 is an enlarged end elevation of the chuck with partial sections showing the tilt adjustment members.

Fig. 7a is a diagrammatic view showing the relationship between the spherical bearings of the main and auxiliary supports of the chuck and the corner posts associated therewith.

Fig. 10 is a fragmentary sectional view on line 10—10 of Fig. 8 and detailing certain holding mechanism associated with the supporting posts.

Fig. 11 is an enlarged transverse sectional view of the chuck showing certain hydraulic lifting jacks associated therewith.

Fig. 12 is an enlarged fragmentary sectional view taken in the plane of the line 12—12 in Fig. 4 and detailing a portion of the indexing mechanism.

Fig. 12a is an enlarged fragmentary horizontal sectional view taken in the plane of the line 12a—12a in Fig. 12.

Figure 8:
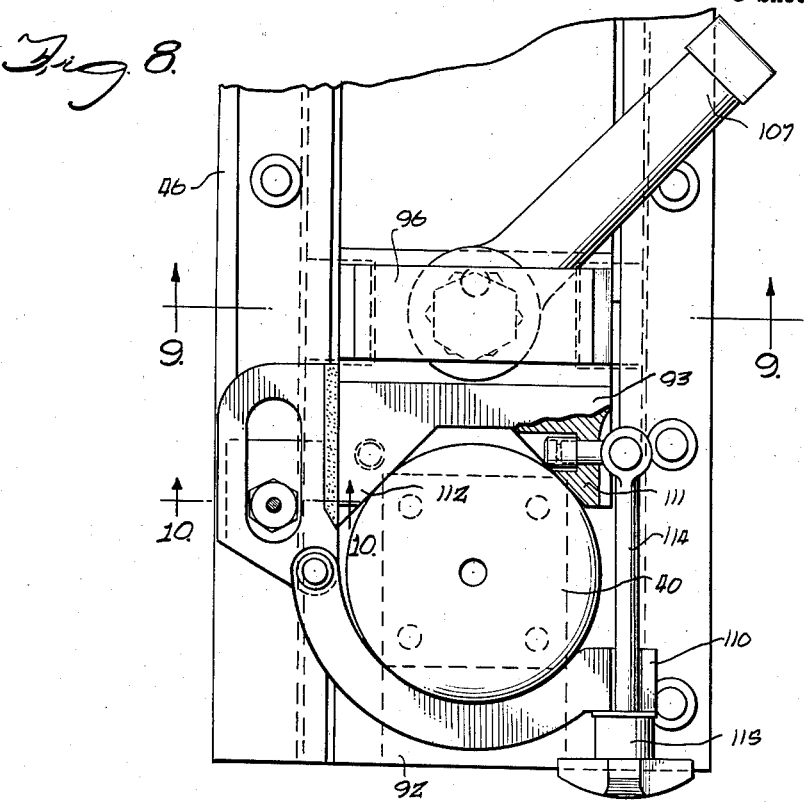
Fig. 8 is a further enlarged partial plan view showing a portion of the tilt adjustment clamping means.

While the invention is susceptible of various modifications and alternative constructions, an illustrative embodiment has been shown in the drawings and will be herein described in some detail. It is to be understood, however, that there is no intention to limit the invention to the specific form disclosed, the intention being, on the contrary, to cover all modifications and alternative constructions falling within the spirit and scope of the invention as expressed in the appended claims.

Referring more specifically to the drawings, the invention is there exemplified in a chuck 20 having vacuum hold-down means in its work-supporting face 21 and adapted to be mounted on a reciprocating table 22 of a planer type milling machine 23. The machine 23, as shown in Fig. 1, will be recognized as being of the type known to those skilled in the art as a "skin miller." It comprises, in general, a bed having horizontal ways 24 which slidably support a table 22 upon which a workpiece or chuck can be mounted. The table can be reciprocated longitudinally of the bed and ways so as to pass under, and subject work mounted thereon, to the action of various milling cutters 25. Straddling the ways 24 and located at the central region thereof is a pair of spaced apart upstanding columns 26 spanned by a transverse beam or arch 27. The front faces 28 of the columns 26 are formed with vertical guideways 29 which are engaged by a crossrail 30 adapted to be traversed vertically along the guideways 29. The front face 31 of the crossrail 30 is provided with horizontally extending ways 32 having one or more headstocks 33 mounted thereon for horizontal traverse along the ways 32. The headstocks 33 are adapted for vertical profiling operation and the cutters 25 are of a type appropriate for this purpose.

The chuck 20 when mounted on the table of a machine of the foregoing type is adapted to receive a workpiece W and securely hold it against movement so that the entire upper surface of the workpiece may be exposed for machining. For workpieces of substantial area, a vacuum hold-down arrangement has been found to be highly satisfactory, although other hold-down means may be employed to advantage depending upon the necessities of a particular operation.

The workpiece W, when mounted on the chuck, can be presented to the cutter or cutters 25 in the proper angular attitude for machining by setting the chuck in the desired angular position. Referring more particularly to Fig. 1a, which illustrates diagrammatically the relationship of the chuck face 21 to the machine table 22, it can be seen that the chuck can be located at a predetermined angular position relative to the table by angular adjustment about one or more of three coordinate axes A—A, B—B and C—C. Such axes intersect at a common central point P located on or in the vicinity of the work-supporting surface of the chuck and, when the chuck is alined parallel to the table, are mutually perpendicular or coordinate. Index positioning of the chuck 20 can be accomplished by pivoting the same about vertical axis A—A, which, in this instance, is perpendicular to the machine table. Longitudinal tilt positioning of the chuck, or in other words end-for-end tilt, can be effected by angularly adjusting the chuck about axis B—B which extends transversely of the chuck surface 21 and the underlying machine table. Similarly, transverse tilt positioning of the chuck, or side-for-side tilt, can be effected by angularly adjusting the chuck about axis C—C which extends longitudinally of the chuck surface and the machine table.

In the present embodiment as illustrated in Fig. 1, the chuck is mounted on the machine 23 with its longitudinal axis parallel to the direction of movement of the table 22 along the ways 24. The workpiece W can then be secured in place on the chuck face 21, and after suitable adjustment thereof about one or more of the coordinate axes A—A, B—B, C—C, ribs 35 or other desired contours can be machined therein while the cutter path is maintained parallel to the movement of the machine table along the ways. Moreover, the construction and arrangement of the chuck 20 are such that tilt, index or combined adjustments of the same to accommodate variations between the different contours to be machined can be made with speed and accuracy.

General organization of chuck

The chuck, shown at 20 in Fig. 2, is supported on and above the table 22 mainly through a suitable pedestal rigidly attached to the table and connected to the chuck through a load sustaining universal joint 36 which permits free and independent tilting of the chuck in any direction about the point P fixed with respect to both the table and chuck. The universal joint 36 also permits indexing adjustment of the chuck about the fixed point of tilt P. The pedestal is in this instance arranged centrally of the chuck and acts through the universal joint 36 to relate the chuck to the table.

The chuck is additionally supported by auxiliary supports which also function to determine and fix the direction and degree of chuck tilt. These auxiliary supports are preferably in the form of posts 40 supported by the table 22 and respectively arranged beneath corner portions of the chuck, although additional intermediate posts 40', such for instance as those shown in Fig. 5, may be used. The posts are of precisely predetermined lengths or heights and are readily replaceable by other posts of different predetermined lengths selected and combined to rigidly sustain the chuck at any desired degree and direction of tilt relative to the table 22. Each post is supportingly related to the chuck through a load sustaining spacer device including an element 43 universally tiltable with the chuck about a tilt point which is fixed with respect to the chuck and fixedly spaced from the associated post in all positions of the chuck.

The individual points of tilt thus established between the chuck and each of the posts and between the chuck and the supporting pedestal are all preferably disposed in a common plane at or in the vicinity of the work-supporting face 21 of the chuck. In this case, the plane of such points is substantially coincident with the plane of the face 21. This geometric relationship simplifies and facilitates the calculations for determining the exact lengths of posts required to establish any particular condition of chuck tilt desired.

Provision is made for effecting indexing adjustment of the chuck, independently of and without disturbing the condition of tilt of the chuck. In furtherance of such objective, each pair of corner posts 40 beneath a chuck end are interconnected for movement as a unit therewith during indexing. Accordingly, each pair of end corner posts is detachably mounted on an indexing slide 47 guided for arcuate movement transversely of the table 22, each slide 47 being connected for indexing movement with the overlying chuck end through the posts 40 and additional members which stabilize the chuck in tilted position. Each set of such members includes a trunnion 45 projecting from the overlying chuck end and interfitting with a cradle which is mounted for vertical movement on and relative to the indexing slide 47.

The two end trunnions 45 are substantially alined and have a common axis substantially coplanar with the above-mentioned plane of the tilt points. Such axis extends through the main tilt point P of the chuck and is substantially coincident with the axis C—C mentioned above. Each trunnion is therefore rockable in its associated cradle 46 in response to transverse tilting of the chuck without disturbing the cradle. Also, the relative vertical movement between each cradle 46 and coacting indexing slide 47 is in a direction to accommodate longitudinal tilting of the chuck.

Indexing movement is imparted to the chuck in this instance by a feed screw 50 connected to actuate one of the indexing slides 47 in any appropriate manner. The indexing motion, which shifts the entire chuck angularly about the axis A—A, is transmitted to the end of the chuck through the coacting indexing slide 47, cradle 46, and engaged trunnion 45. After an indexing adjustment has been completed, the indexing slides 47 can be secured to their associated guideways 48 by means of clamps 53.

The upper half of each trunnion 45 is preferably removed to avoid projecting above the chuck face 21 where it might interfere with machining operations. Also, although the universal joint 36 and the several spacer units 43 are designed and arranged to avoid projection above the chuck face 21 for similar reasons.

Chuck body construction

The chuck 20, in the present instance, is constructed as a relatively large weldment and comprises a unitary plate 41 defining the chuck face 21. The plate 41 has a large surface area and is actually a composite which includes a relatively thick central section flanked by two thinner end sections. Referring to Figs. 3 and 4, it will be noted that the face plate 41 is stiffened on its underside by vertical crossplates 57 welded to and beneath the face plate 41 and rigidly joined by laterally spaced longitudinal channel members 58 welded to the crossplates 57 and also to the face plate. This construction results in an exceptionally strong, rigid and lightweight structure which is advantageous in that inertia is minimized and tilt and indexing adjustment are thereby facilitated.

Conduits 60 are provided on the undersurface 38 of the plate 41 leading to ports 61 (Fig. 1) in the chuck face 21 for the purpose of applying a vacuum to the surface thereof as a hold-down means when a workpiece W is mounted on the chuck. The conduits 60 are connected to each of the surface ports 61 and lead to a manifold 62 which is located at one side of the chuck and connected to a vacuum pump (not shown). Valves 63 are provided in each of the conduits 60 to permit the exposed vacuum outlets in the surface to be closed when the particular workpiece covers only a part of the total face plate area. Any desired number of vacuum ports 61 may be provided in the surface of the chuck face plate, along with appropriate conduits and valves so that any desired portion of the surface 21 of the face plate 41 may be utilized for a particular operation.

Main support

As indicated earlier herein, the main support for the chuck 20 during adjusting and machining operations is provided by the universal bearing 36 mounted on the machine table and at the center of the undersurface of the chuck. As shown in Figs. 2, 3 and 5, such bearing structure comprises generally a convex spherical journal surface 65 rigidly mounted on the underside of the chuck 20 and having its center of curvature 66 located at or in the vicinity of the geometric center of the workholding face 21 of the chuck.

Mounted on the machine table 22 and nestingly cooperating with the spherical journal 65 on the undersurface 38 of the chuck is a generally concave bearing element 67. The latter is fixed to a pedestal 68 which, in turn, is fixed to the machine table as by means of T-bolts. The journal 65 and bearings 67 are of sufficient size to give the chuck the necessary stability with respect to the machine table 22 while permitting chuck adjustments to be made freely. Lubrication means 69 may be provided for the abutting surfaces of the members 65, 67 as desired.

Since the center of curvature 66 of the members 66, 67 corresponds to the point P described above, it will be appreciated that the chuck face 21 remains in a fixed position relative to the machine table and a given distance above it regardless of the degree of tilt of the chuck face from the horizontal.

Adjustable stabilizers

In order to give the chuck 20 adequate lateral support against disturbing forces such as vibration and cutter reaction once the chuck has been adjusted to the desired degree of tilt, and also to keep the chuck in alinement with the indexing slides 47, adjustable stabilizers 71 are provided at the chuck ends 70. One such stabilizer is interpsed between and connected with each indexing slide 47 and the corresponding overlying end 70 of the chuck.

Each stabilizer 71 in this case comprises a corresponding one of the trunnions 45 fixed to a chuck end 70 and a cradle 46 which interfits with the trunnion, the cradle being vertically adjustable relative to its associated indexing slide 47. A bolt 72 is inserted through an angularly enlarged radial slot 73 in each trunnion and threadably engaged with the underlying cradle 46 for the purpose of holding and fixing the trunnion with respect thereto. Each cradle 46 is mounted by means of bolts 75 on a vertically movable slide 74 having outwardly projecting vertical edge portions 76 formed at right angles to the body of the slide 74 and provided with finished outer bearing surfaces 77. The cradle slide 74 is movably mounted on a slideway 78 (Fig. 4) between outwardly projecting vertical guides 79 parallel to the projecting portions of the slide and having finished inner bearing surfaces 80 cooperating with the bearing surfaces on the slide. Longitudinal slots 81, 81a are cut in the projecting bearing surfaces of each cradle slide and slideway, respectively, to permit the insertion of clamping bolts 83 in order to fix the slide 74 with respect to the slideway 78. The slots 81, 81a are cut at the proper angle to accommodate tilting movement of the chuck about the transverse axis B—B (Fig. 1a) through the center bearing. The use of slots in both of the members 74, 78, instead of in just one of these members, serves to increase the length of their relative movement without increasing their physical height.

It will be apparent from the foregoing, and from an inspection of Figs. 1, 6 and 7, that the trunnion and cradle construction will permit tilting movement of the chuck about the longitudinal axis C—C and the cradle slide and slideway construction will permit tilting about the transverse axis B—B. During tilt adjustment about either or both of the axes B—B, C—C, the chuck, or more specifically the face plate 41 and chuck face 21, remain in substantial alinement with the indexing slides 47. This is due to the fact that the adjustable stabilizers 71 afford a certain amount of guiding to these members while tilt adjustments are being made.

Each adjustment of the stabilizers 71 is controlled by the tilt adjustment means of the chuck and is determined as an incident to effecting a tilt adjustment. When, however, the desired tilt adjustment has been completed, the stabilizer clamping bolts 72, 83 are tightened securely and the stabilizers 71 then provide lateral support and stability during machining operations.

Indexing assembly and adjustment

In order to provide for angular adjustment or indexing of the chuck about the vertical axis A—A which is perpendicular to the surface of the machine table 22, resort is had to the indexing slides 47 and to the arcuate guideways 48 associated therewith. The guideways 48 are rigidly mounted adjacent opposite ends of the machine table 22 in such a position that their center of curvature lies on the axis A—A. One of the arcuate slides 47 (Fig. 2) is mounted in each set of guideways 48 and carries a corresponding one of the cradle slideways 78 which is rigidly fixed thereon. The chuck face plate 41, being secured to the cradle slideways 78 through the trunnions 45 and cradles 46, is therefore fixed with respect to the indexing slides 47 and movement of the slides in the arcuate guideways 48 correspondingly rotates the chuck. Indicators 82 (Fig. 7) extend laterally from each side of the slideway 78 at one end of the chuck, in this instance the end shown in Figs. 1, 4, 6 and 7. Graduated index scales 84 are secured in predetermined fixed relation to the adjacent indexing slide guideway 48 and in a visible position wherein they are readable by the indicators 82. The angular position of the chuck about axes A—A is thus readily determined by reference to the position of the indicators or with respect to the scale 84.

In order to impart indexing movement to the chuck 20, one of the indexing slides 47 is arranged for cooperation with a horizontal feed screw 50 whose threads 85 engage a nut 86 pivotally connected to the cradle slideway 78, the latter being rigidly connected to the slide 47. The feed screw 50 is journaled in bearings 87 fixed to the machine table 22 so that when the screw is rotated, either by a crank or by alternative power means, it will cause movement of the index slide 47 along the arcuate guideways 48 resulting in the angular rotation of the chuck with respect to the machine table. The nut 86 (Figs. 2, 12, 12a) has a depending pin 88 carrying an anti-friction bearing 89 closely engaged in a transverse slot 90 formed in a lateral extension 91 of the cradle slideway 78 in order to permit rotation of the nut relative to the slideway while transmitting lateral motion thereto.

After the chuck has been indexed through the desired increment of angular movement about the axis A—A, the indexing slides 47 must be clamped in their guideways 48 in order to hold the chuck rigid with respect to the machine table. Refering now to Figs. 8 and 9, a platform 92 having an upwardly extending column 93 at its inner end is provided on the upper surface of the outer ends of the indexing slides 47. A yoke-like clamping member 95 straddles the platform 92 and the transverse section 96 of the yoke 95 rotatably engages a bolt 98 threadably mounted in a hole 99 in the upper end of the column 93. Projections 101, 101' on the yoke extremities 100, 100' are adapted respectively to engage the bottom faces of cleats 102, 102' secured to the arcuate guideway with bolts 103. When the clamping bolt 98 is threadedly moved away from the indexing slide platform column 93, the head 105 engages the underside of the transverse yoke section 96 and forcibly urges apart the yoke and the index slide platform 92. Since the projecting portions 101, 101' on the yoke extremities 100, 100' are engaged by the cleats 102 fastened to the guideway, a relative force is created between the yoke and the platform 92 resulting in the clamping of the slide with respect to the guideway and hence clamping of the chuck 20 with respect to the machine table.

A yoke-type clamping member 53 of the foregoing description is provided at each of the corners of the chuck 20. In order to adjust the chuck angularly with respect to the machine table, the operator merely loosens the yoke clamping devices 53 and rotates the index screw 50 with the crank handle 106 to index the chuck to the desired angular position. The yokes can then be tightened to fix the chuck with respect to the table to prevent further indexing movement during cutting operations. A convenient wrench 107 can be provided on the tightening bolt to permit ready adjustment and to prevent the loss of a tool suitable for use in the particular bolt location.

*Auxiliary supports and tilt adjustment*

Figure 9:
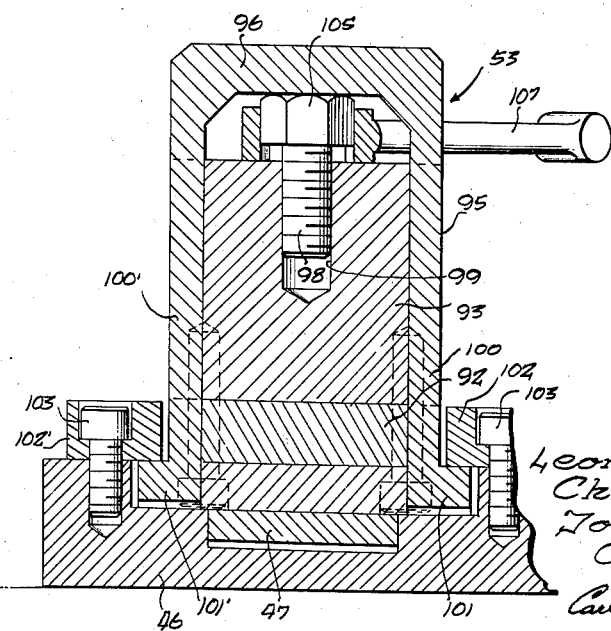
Fig. 9 is a further enlarged sectional view through the index adjustment clamping means taken on line 9—9 of Fig. 8.

In order to achieve rapid and precise tilt adjustment of the chuck about the transverse and longitudinal axes B—B, C—C through the geometric center of the chuck surface 21, resort is had to auxiliary supports, including their precisely dimensioned support posts 40, for controlling tilt. In the present instance, these posts are employed adjacent each of the corners of the chuck and, if warranted by the requirements of a particular situation, they may also be employed at intermediate points. As shown in Figs. 7 and 8, the posts 40 are removably mounted on the platforms 92 which are fixed to the index slides 47. Quick release type clamping devices 110 are attached to these platforms in order to provide means for holding the posts rigid with respect to the platforms. Accordingly, it will be noted that projections 111 and 112 extend from each upstanding column 93 and embrace the post 40 in such a manner as to prevent sideward movement thereof. A cooperating clamping jaw, which is secured to a projection 112 of the column, wraps around the post 40 to hold it rigidly to the column. The jaw is releasably held to the column 93 as by means of a bolt 114 pivotally secured to a projection 111 and having a hand tightened nut 115.

Provision is made in the tilt support structure of the chuck 20 for obtaining tilt control as a direct function of post dimension regardless of the tilt angle. This involves the use of spherical bearings 43, mentioned earlier herein, in cooperation with the posts 40. In the present instance, such bearings are provided adjacent each of the four corners of the chuck 20 and at two intermediate points since a total of six posts 40, 40' are being used. As indicated earlier herein, however, the number of posts may be varied to suit individual situations.

Referring to Fig. 7, it will be seen that each bearing 43 comprises a concave seat member 117 slidably seated on the top end surface of a post 40, and a convex member 118 nested therein and fixed to the chuck face plate 41. The construction of the members 117, 118 is such that their common center of curvature 119 is fixed relative to the chuck and preferably lies in the plane of the chuck face 21. The member 117 may be held in nested relation with the member 118 by various expedients and, in this case, by a plurality of small springs 120 which permit relative swiveling between these members.

The chuck face plate 41 is shown in Figs. 2 and 7 mounted on the machine table 22 in a position generally parallel thereto. This particular position, which for convenience will be called the "neutral" position as distinguished from the "tilted" position, obtains when the chuck plate is positioned above the table by four or more posts 40 of equal height. Referring more specifically to Fig. 7a, the chuck face plate 41 is there shown diagrammatically in a tilted position 41a rather than in neutral position. It should be understood that the face plate 41 could also be adjusted to occupy an opposite tilted position indicated at 41b. In order to simplify the geometrical calculations required to determine the particular support post height required to position the chuck at a desired angle R from the neutral position, the spherical bearings 36 and 43 of the main and auxiliary supports should have their centers of curvature located in a common plane at or in the vicinity of the chuck face 21. When machining calculations are made with respect to the exposed surface of the workpiece W this plane should be as nearly coincident with the surface thereof as possible. For purposes of the present description, the plane chosen will be that of the chuck face 21, although any convenient reference plane near the chuck face may be employed with equally satisfactory results.

In Fig. 7a, this reference plane is shown in side elevation and hence as a straight line coincident with the chuck face 21, the face plate 41 being in a tilted or canted position 41a. The centers of curvature 119, 119' of the bearings 118, 118' and bearing seats 117, 117' lie on the line 41a, as does the center of curvature P of the bearing 36. The points 119, 119' must be equidistant from the point P although not necessarily in a straight line therewith. The distance between each point 119 and 119', from a projection of the point P on a straight line connecting 119 and 119', is indicated as the equal distance Z, the total distance between 119 and 119' thereby being 2Z. Because the bearing units 43 are of a constant dimension and their centers of curvature lie in a common plane, the distance between points 119, 119' and the flat lower ends of the bearing seats 117, 117' respectively, indicated by the letter X, will be a constant. The distance X will, moreover, remain a constant for any position of tilt which the chuck face 21, or the reference plane, may assume within its limits of tilting movement.

A particular tilt angle, designated by the letter R, may thus be given to the chuck surface 21 by the use of posts 40 whose difference in height, indicated by the letter Y, is a simple function of the angle R, as expressed by the equation:

$$Y = 2Z \sin R$$

In order to obtain a compound tilt, that is a tilt about two coordinate axes, such as transverse axis B—B and longitudinal axis C—C (Fig. 1a), it is only necessary to apply this equation to two adjacent sides of the chuck 20 and adjust the posts accordingly.

Provision is made in the chuck 20 for "locking up" or clamping the posts 40 and the various other related members involved in effecting tilt adjustments of the chuck face 21 so that all corners of the face plate are securely and positively held down during cutting operations. This is accomplished by the use of a tensile "lock up" or clamping arrangement which, in the present instance, comprises two hold-down cables 51, 51' (Figs. 2, 4 and 10). These cables extend generally lengthwise along the underside of the chuck and each passes over an arcuate guide 121 at one corner of the chuck and a similar guide 121' at the diagonally opposite corner thereof. The ends of the cables 51 and 51' are attached to anchoring blocks 122 (Fig. 10) adapted to cooperate with anchoring members 123 integral with the post supporting platform 92 mounted on the indexing slides 47.

Pneumatic or hydraulic actuators 125 (Fig. 3) or other appropriate take-up devices may be employed to tension the cables after anchoring blocks 122 are engaged in the anchoring members 123 to fix and hold the posts 40 with respect to the chuck. Because of the fact that each cable extends between diagonally opposite corners of the chuck, cable length remains constant regardless of tilt. As a result, each tensioning device 125 need only move through that constant distance represented by the deflection of the cable required to produce a predetermined tension, regardless of the particular tilt adjustment being made. It will, of course, be appreciated that clamping of the tension cables 51 and 51' does not interfere in any way with adjustment of the indexing slides 47 the cable clamping devices are independent of the yoke-clamping means 95 of the slides 47.

In order to facilitate changing of the posts 40 and hence speed up tilt adjustments, mechanical or hydraulic jacks 130 are provided to engage the underside of the chuck table when it is in various positions of tilt, as shown by dot-dash lines in Fig. 11. The jacks 130 simply lift or deflect one side of the chuck at a time a very slight amount to relieve the posts on that side of load, permitting the removal of previously used posts and insertion of posts of the desired dimensions. If hydraulic jacks are used along with hydraulic cable tensioning means, it is possible to rely upon a single source of hydraulic power for loosening the tension cables, operating the jacks and subsequently tightening the cables. The jacks 130, as shown in Fig. 11, are preferably mounted on the machine table although such a permanent mounting is not necessary and the jacks could be entirely portable.

Synopsis of operation

For the purpose of further illustrating and setting forth the advantages of the present invention, a brief synopsis of operation is presented below. It should be understood, however, that such synopsis is given by way of illustration and not of limitation. In Fig. 1 the chuck 20 is shown mounted on the table 22 of a skin miller in a neutral or initial position wherein the work-supporting face 21 of the chuck is substantially parallel to the machine table.

In order to change the angular position of the chuck and the workpiece W mounted thereon, the trunnion and cradle clamps 72, 83 of stabilizers 71, and the tension cables 51, 51', are loosened so that the jacks 130 can be applied to lift the chuck 20 a sufficient amount to permit spacer posts 40 of the proper dimensions to be inserted in the proper locations between the table and the chuck. If a number of similar operations are to be performed on a series of workpieces, posts can be classified and stored in sets of previously calculated dimensions to give predetermined tilt angles when used with the chuck. When the posts are in position, the chuck surface is lowered so that the flat surfaces of the bearings 43 on the underside thereof abuttingly engage the posts. The trunnion and cradle clamps of adjustable stabilizers 71, and the tension cable clamps 52 are then secured to hold in a rigid, unitary assemblage the posts 40, chuck face plate 41, spherical bearings 43, and index slides 47.

With the angle of tilt now set in the desired fixed position, the chuck is indexed about the vertical axis A (Fig. 1a) by means of the indexing screw 50 and crank 106. The chuck face plate 41 is, of course, fixed to the index slides 47 by the adjustable stabilizers 71 and the tension cable clamps 52, being guided during indexing by the movement of the slides 47 in the guideways 48. When the chuck has been indexed the desired number of degrees, as shown by the indicators 82 and scales 84, the slides 47 are clamped to the guideways by tightening the yoke clamps 53 with the handles 107.

We claim as our invention:

1. A tilting table structure for a machine tool including a base and a table supported in spaced relation thereto, supporting means intervening the base and table including a ball and socket swivel, a power means carried by the base and engaging the table at a plurality of points in spaced relation to said ball and socket swivel for effecting tilting of the table about two axes intersecting at said swivel and lying in a plane parallel to said base, and means attached to said table along one of said axes and spaced from said swivel for preventing rotary movement of said table about an axis passing through said swivel perpendicular to said plane, said means including a swivel joint having interfitting parts, one of which is secured to the table and the other guided on said base for confined movement along said one of said axes.

2. A tilting table structure for a machine tool including a base and a table supported in spaced relation thereto, supporting means intervening the base and table including a ball and socket swivel, a power means carried by the base and engaging the table at a plurality of points in spaced relation to said ball and socket swivel for effecting tilting of the table about two axes intersecting at said swivel and lying in a plane parallel to said base, means attached to said table along one of said axes and spaced from said swivel for preventing rotary movement of said table about an axis passing through said swivel perpendicular to said plane, said means including a swivel joint having interfitting parts, one of which is secured to the table and the other guided on said base for confined movement along said one of said axes, and means carried by the table for maintaining the interfitting parts of the swivel joint in closed interfitting engagement one with the other.

3. A tilting table structure for a machine tool including a base and a table supported in spaced relation thereto, supporting means intervening the base and the center of said table including a ball and socket swivel, power means carried by the base and engaging the table at a plurality of points in spaced relation to said central ball and socket swivel for effecting tilting of the table with respect to the base about two axes intersecting at said swivel and lying in a plane parallel to said base, and means attached to said table along one of said axes and spaced from said swivel for preventing rotary movement of said table about an axis perpendicular to said plane, said means including a swivel joint having interfitting parts, one of which is secured to the table and the other comprising a member guided on said base for movement in a vertical plane including an axis through said swivel normal to said intersecting axes, and means for maintaining the interfitting parts of the swivel joint in close interfitting engagement one with the other including means carried by the table and reacting on said member.

4. A tilting and indexing workholder for supporting a workpiece in predetermined angular positions in a machine tool having a table or underlying support, said workholder comprising, in combination, an elongated face plate for supporting the workpiece, a main spherical bearing connected with said face plate and supporting the same on the machine tool table for universal movement with respect to three coordinate axes two of which lie in a plane parallel to the table and the other one of which is normal thereto, a plurality of auxiliary spherical bearings connected with said face plate at points spaced from said main spherical bearing, at least one index slide disposed for movement about said normal one of said coordinate axes, clamping means for said index slide, a plurality of replaceable support posts interposed between said index slide and said auxiliary spherical bearings for controlling the attitude of said face plate about said other two of said axes, said face plate and said support posts being bodily movable with said index slide, and stabilizing means interposed between and connecting said index slide and said face plate for holding said face plate in a position determined by said replaceable support posts and said index slide.

5. A tilting and indexing workholder for supporting a workpiece in predetermined angular positions in a machine tool having a table guided on main ways so that the workpiece can be machined in a direction substantially parallel with that of the main ways, said workholder comprising, in combination, an elongated face plate having an upper surface for supporting the workpiece, a main spherical bearing mounted on the underside of said face plate and supporting the same on the machine tool table for universal movement with respect to three coordinate axes two of which lie in a plane parallel to the machine tool table and the other one of which is normal thereto, a plurality of auxiliary spherical bearings also mounted on the underside of said face plate at points spaced from said main spherical bearing, all said spherical bearings having centers of curvature lying in a common plane including the face plate surface, a plurality of index slides disposed for arcuate movement about said normal one of said coordinate axes, releasable clamping devices for securing said index slides in fixed positions, a plurality of replaceable support posts of selectively predetermined sizes interposed between said index slides and said auxiliary spherical bearings for controlling the attitude of said face plate about said two of said axes, said face plate and said support posts being bodily movable with said index slide, tensile lock-up connections between said index slides and said face plate, stabilizing means interposed between and connecting said index slides and said face plate for holding said face plate in a position determined by said replaceable support posts and said index slides, and means for temporarily relieving the load on said support posts during replacement thereof.

6. A tilting workholder for holding a workpiece at a selected attitude in a machine tool having a table or underlying support and comprising, in combination, a face plate adapted to receive a workpiece on one surface thereof, a main spherical bearing connected with the opposite side of said face plate and supporting the same on the machine tool table for universal tilting movement with respect to a plurality of coordinate axes, a plurality of auxiliary spherical bearings connected with said opposite side of said face plate at a plurality of points spaced from said main spherical bearing, all said spherical bearings having centers of curvature lying in a common plane including the face plate surface, a plurality of replaceable support posts of predetermined lengths disposed in abutment with said auxiliary spherical bearings for controlling the attitude of said face plate, and stabilizer means for preventing rotary movement of said face plate about an axis through said main spherical bearing normal to the machine tool table.

7. A tilting and indexing workholder for supporting a workpiece at a selected attitude in a machine tool having a table and comprising, in combination, a face plate for supporting the workpiece, main support means for supporting said face plate on the machine tool table for movement with respect to three coordinate axes two of which lie in a plane parallel to the machine tool table and the other of which is normal thereto, auxiliary support means for supporting said face plate at a plurality of points spaced from said main support means, said auxiliary support means being adjustable to determine the attitude of said face plate about said two of said axes, index means underlying said auxiliary support means for angularly adjusting the same and said face plate about said normal one of said axes, a trunnion fixed to said face plate, a cradle interengaging with said trunnion, a releasable clamp between said trunnion and said cradle, a cradle slide fixed to said cradle, a slideway mounted on said index slide and adapted to interfit with said cradle slide, and a releasable clamp connecting said cradle slide and said slideway, said trunnion and cradle stabilizing said face plate in an attitude determined by said auxiliary support means and said index means.

8. A tilting and indexing workholder for supporting a workpiece at a selected attitude in a machine tool having a table or underlying support and comprising, in combination, a face plate for supporting the workpiece, main support means for supporting said face plate on the machine tool table for movement with respect to three coordinate axes two of which lie in a plane parallel to the machine tool table and the other of which is normal thereto, auxiliary support means for supporting said face plate at a plurality of points spaced from said main support means, said auxiliary support means being adjustable to determine the attitude of said face plate about said two of said axes, index means underlying said auxiliary support means for angularly adjusting said support means and said face plate about said normal one of said axes, and stabilizing means engaged between said face plate and said index means for stabilizing said face plate in an attitude determined by said auxiliary support means and said index means.

9. A tilting and indexing workholder for supporting a workpiece at a selected attitude in a machine tool having a table or underlying support and comprising, in combination, a face plate for supporting the workpiece, main support means for supporting said face plate on the machine tool table for movement with respect to three coordinate axes two of which lie in a plane parallel to the machine tool table and the other of which is normal thereto, auxiliary support means for supporting said face plate at a plurality of points spaced from said main support means, said auxiliary support means being adjustable to determine the attitude of said face plate about said two of said axes, index means underlying said auxiliary support means for angularly adjusting said support means and said face plate about said normal one of said axes, stabilizing means engaged between said face plate and said index means for stabilizing said face plate in an attitude determined by said auxiliary support means and said index means, and tensile means for rigidly holding said face plate to the machine tool table in the attitude determined by said auxiliary support means.

10. A tilting workholder for holding a workpiece at a selected attitude in a machine tool having a table or underlying support and comprising, in combination, a face plate adapted to receive a workpiece on one surface thereof, a main spherical bearing connected with the opposite side of said face plate and supporting the same on the machine tool table for universal tilting movement with respect to a plurality of mutually intersecting axes including an axis normal to the machine tool table, a plurality of auxiliary spherical bearings connected with said opposite side of said face plate at a plurality of points spaced from said main spherical bearing, all said spherical bearings having centers of curvature lying in a common plane including the point of intersection of said axes, adjustable support means disposed in abutment with said auxiliary spherical bearings for controlling the attitude of said face plate, and stabilizing means for preventing rotary movement of said face plate about said axis normal to the machine tool table.

11. A tilting and indexing workholder for supporting a workpiece at a selected attitude in a machine tool having a table or underlying support and comprising, in combination, a face plate for supporting the workpiece, main support means for supporting said face plate on the machine tool table for movement with respect to three coordinate axes two of which lie in a plane parallel to the machine tool table and the other of which is normal thereto, auxiliary support means for supporting said face plate at a plurality of points spaced from said main support means, said auxiliary support means being adjustable to determine the attitude of said face plate about said two of said axes, index means underlying said auxiliary support means for angularly adjusting said auxiliary support means and said face plate about said normal one of said axes, a trunnion member fixed to said face plate, a cradle member interengaging with said trunnion member, a releasable clamp for clamping said trunnion and said cradle together, and means for mounting said cradle on the table for vertical and horizontal movement and for stabilizing said cradle against rotary movement about said normal one of said axes, said trunnion and cradle stabilizing said face plate in an attitude determined by said auxiliary support means and said index means.

References Cited in the file of this patent

UNITED STATES PATENTS

| | | |
|---|---|---|
| 2,217,783 | Bell | Oct. 15, 1940 |
| 2,243,013 | Morey | May 20, 1941 |
| 2,441,413 | Hassig | May 11, 1948 |
| 2,520,455 | Clachko | Aug. 29, 1950 |
| 2,680,994 | Wood | June 15, 1954 |
| 2,699,708 | Fotsch | Jan. 18, 1955 |
| 2,774,642 | Waller | Dec. 18, 1956 |